United States Patent [19]

Eisenberg

[11] Patent Number: 5,170,039
[45] Date of Patent: Dec. 8, 1992

[54] MULTIFUNCTION TOASTER
[75] Inventor: Roger Eisenberg, Marly, France
[73] Assignee: SeB S.A., Selongey, France
[21] Appl. No.: 533,356
[22] Filed: Jun. 5, 1990
[30] Foreign Application Priority Data
   Jun. 9, 1989 [FR] France .................................. 89 07657
[51] Int. Cl.$^5$ .......................... F24C 7/06; A47J 27/086
[52] U.S. Cl. .................................... 219/386; 219/236;
   219/393; 219/395; 219/397; 219/398; 219/538;
   219/552; 99/329 RT; 99/385
[58] Field of Search ............... 219/386, 236, 398, 521,
   219/552, 538, 393, 395, 413, 397; 99/329 RT,
   385, 389, 390, 391, 401; 338/296, 298, 299, 260,
   261, 270

[56] References Cited
U.S. PATENT DOCUMENTS

| 891,400 | 6/1908 | Brown | 219/552 |
|---|---|---|---|
| 2,851,573 | 9/1958 | Muccilli | 219/521 |
| 3,347,153 | 10/1967 | Sutton | 219/521 |
| 3,358,122 | 12/1967 | Torrey | 219/397 |
| 3,364,338 | 1/1968 | Holtkamp | 219/395 |
| 3,585,363 | 6/1971 | Price | 219/494 |
| 3,684,860 | 8/1972 | Snyder | 219/398 |
| 3,684,861 | 8/1972 | De Remer | 219/398 |
| 4,280,046 | 7/1981 | Shimotori et al. | 219/552 |
| 4,382,175 | 5/1983 | Huggler | 219/396 |
| 4,538,049 | 8/1985 | Ryckman, Jr. | 219/395 |
| 4,580,035 | 4/1986 | Lüscher | 219/395 |
| 4,641,015 | 2/1987 | Mayeur | 219/393 |

FOREIGN PATENT DOCUMENTS

| 573097 | 1/1987 | Australia . |
|---|---|---|
| 2340582 | 9/1977 | France . |
| 639393 | 6/1946 | United Kingdom . |
| 636330 | 5/1948 | United Kingdom . |

Primary Examiner—Bruce A. Reynolds
Assistant Examiner—Tuan Vinh To
Attorney, Agent, or Firm—Young & Thompson

[57] ABSTRACT

The toaster comprises a housing for receiving the pieces of bread to be toasted or to be reheated and on both sides of this housing an electric heating element having an electric resistor ($R_1$, $R_2$) wound on an elongated support made of insulating material (10, 11).

On both sides of the housing there is provided at least one second electric resistor ($R_3$, $R_4$), commutation being provided to connect to the mains, as desired, one or both of the abovementioned resistors.

Use: to permit a plurality of heating modes in toasters.

8 Claims, 3 Drawing Sheets

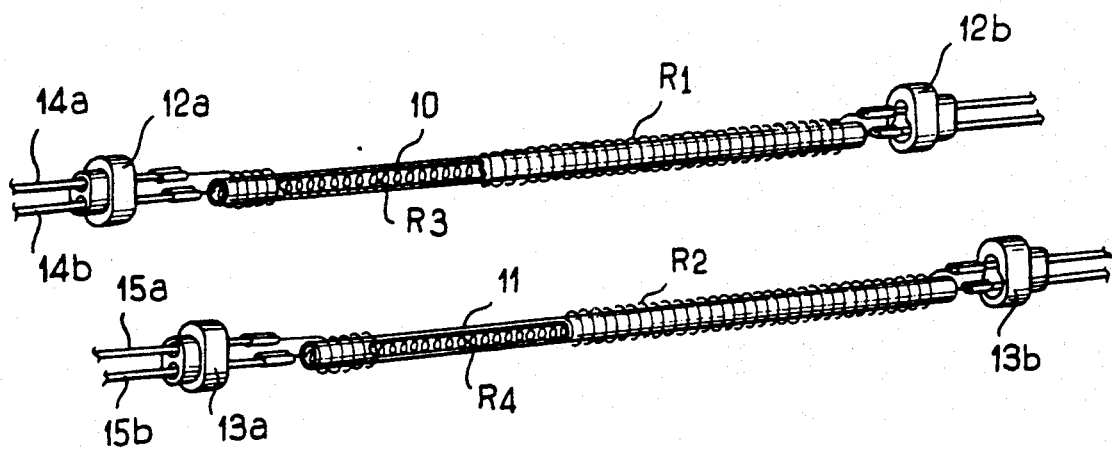
FIG_2
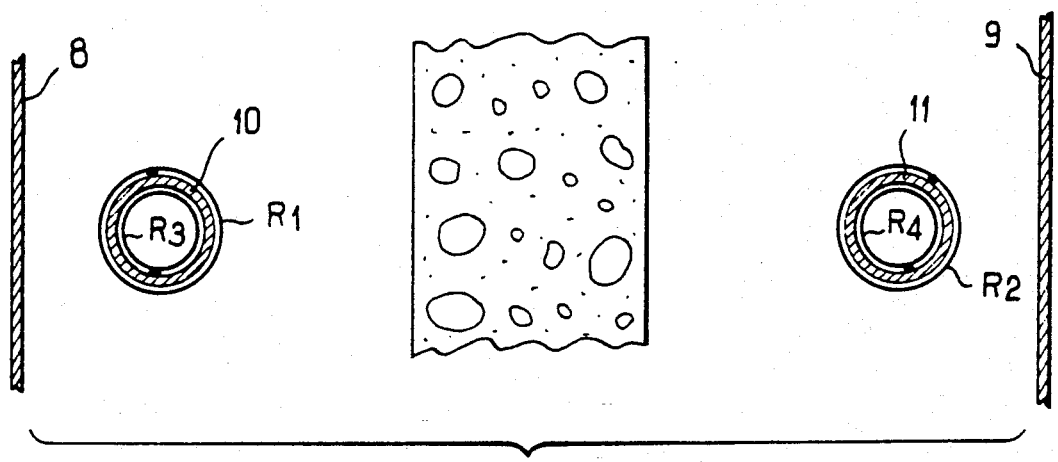
FIG_3
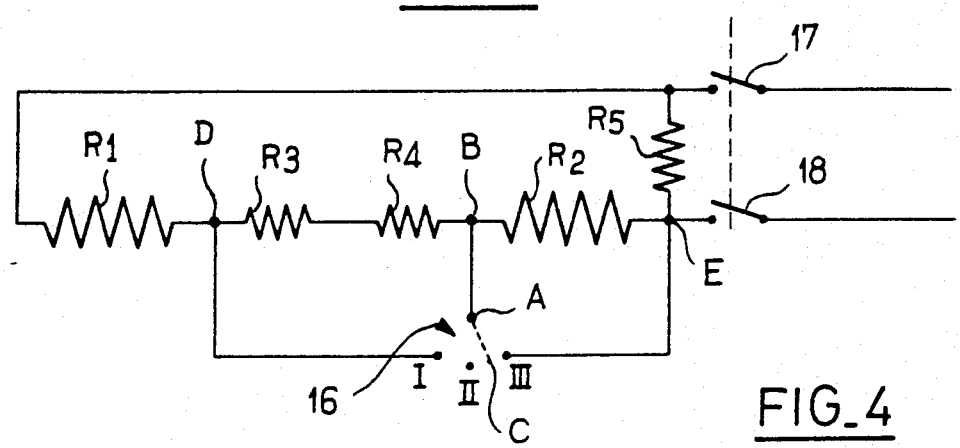
FIG_4

MULTIFUNCTION TOASTER

FIELD OF THE INVENTION

The present invention relates to an improved toaster.

BACKGROUND OF THE INVENTION

The known toasters comprise a housing for receiving the pieces of bread to be toasted or reheated and on both sides of this housing a heating element consisting of a bar or tube made of thermally insulating material such as steatite, around which an electric resistor is helically wound.

These heating elements emit, toward the pieces of bread accommodated in the appliance, infrared radiation which is intended to color or toast their surface.

The result obtained on the pieces of bread is dependent, in the case of a given surface, source of infrared radiation and type of bread, upon the power of the source and the time of exposure.

For this reason, a powerful source will color the surface of the bread in very short periods of time with little evaporation of water (soft toast). In contrast, a weak power source will color the surface of the bread in long periods of time with much evaporation of water (dry or crispy toast).

Since the appliance has a defined time scale, which has to be the same whatever the mode of operation, the invention proposes to adapt the power of emission of the heat radiation in accordance with the user's needs by commutation of additional resistive heating elements.

The pieces of bread take the form of slices of bread, pieces of baguettes, loaves cut lengthwise or pre-sliced pieces of bread of various shapes.

The known toasters are designed essentially to toast slices of bread or pieces of baguette.

This toasting results in a brown coloration of the sides of the slices or pieces of bread facing the radiation emitted by the two heating elements.

The users are often required to defrost or reheat pieces of bread without this resulting in a superficial coloration of these pieces.

It is not possible to obtain this result with the known toasters. In fact, in the case of defrosting pieces of bread, a pronounced browning of their surface appears before their core is defrosted.

Moreover, in the case of pieces of baguettes, one of the sides thereof already has a toasted crust and it is consequently desirable to toast only the other side devoid of crust without browning the latter too much.

OBJECTION OF THE INVENTION

The object of the present invention is to improve the known toasters so as to provide them with a plurality of heating modes making it possible to obtain the above-mentioned results.

SUMMARY OF THE INVENTION

The toaster aimed at by the invention comprises a housing for receiving the pieces of bread to be toasted or to be reheated and on both sides of this housing an electric heating element having an electric resistor wound on an elongated support made of insulating material.

According to the invention, this toaster is defined in that commutation means are provided to connect to the mains, as desired, one or both of the above-mentioned resistors so as to control, as desired, the three following heating modes:

heating at maximum power on both sides of the housing, heating at maximum power on one side of the housing and moderate or no heating on the other side of the housing, moderate heating on each side of the housing.

The user can thus modify the heating power and/or the distribution of heating over the pieces of bread, so as to obtain either normal toasting, or defrosting or reheating or different toasting on the opposite sides of the pieces of bread.

According to an advantageous version of the invention, each insulating support also carries a second electric resistor.

Preferably, the insulating supports each consist of a tube made of insulating material such as steatite, the first resistor being helically wound around this tube.

According to a preferred version of the invention, the second resistor extends helically inside the tube made of insulating material.

This arrangement of the second resistor inside the tube which already carries the first resistor on the outside is more economical than the solution which consists in using another insulating support for the second resistor.

Furthermore, on account of the fact that the second resistor is incorporated in the insulating tube, the heating generated by this second resistor does not produce any superficial browning of the pieces of bread within the defined periods of time, thereby permitting defrosting and reheating of these pieces of bread.

Other features and advantages of the invention will become more apparent in the description below.

BRIEF DESCRIPTION OF THE DRAWING

In the attached drawings given by way of non-limiting examples:

FIG. 2 is a perspective view of the two heating tubes of the toaster according to the invention, FIG. 3 is a partial diagrammatic sectional view of a toaster according to the invention, showing the two heating tubes on both sides of a slice of bread, FIG. 4 is a view of the electrical diagram of connections of the various heating resistors.

DESCRIPTION OF THE PRESENT INVENTION

Figure 1:
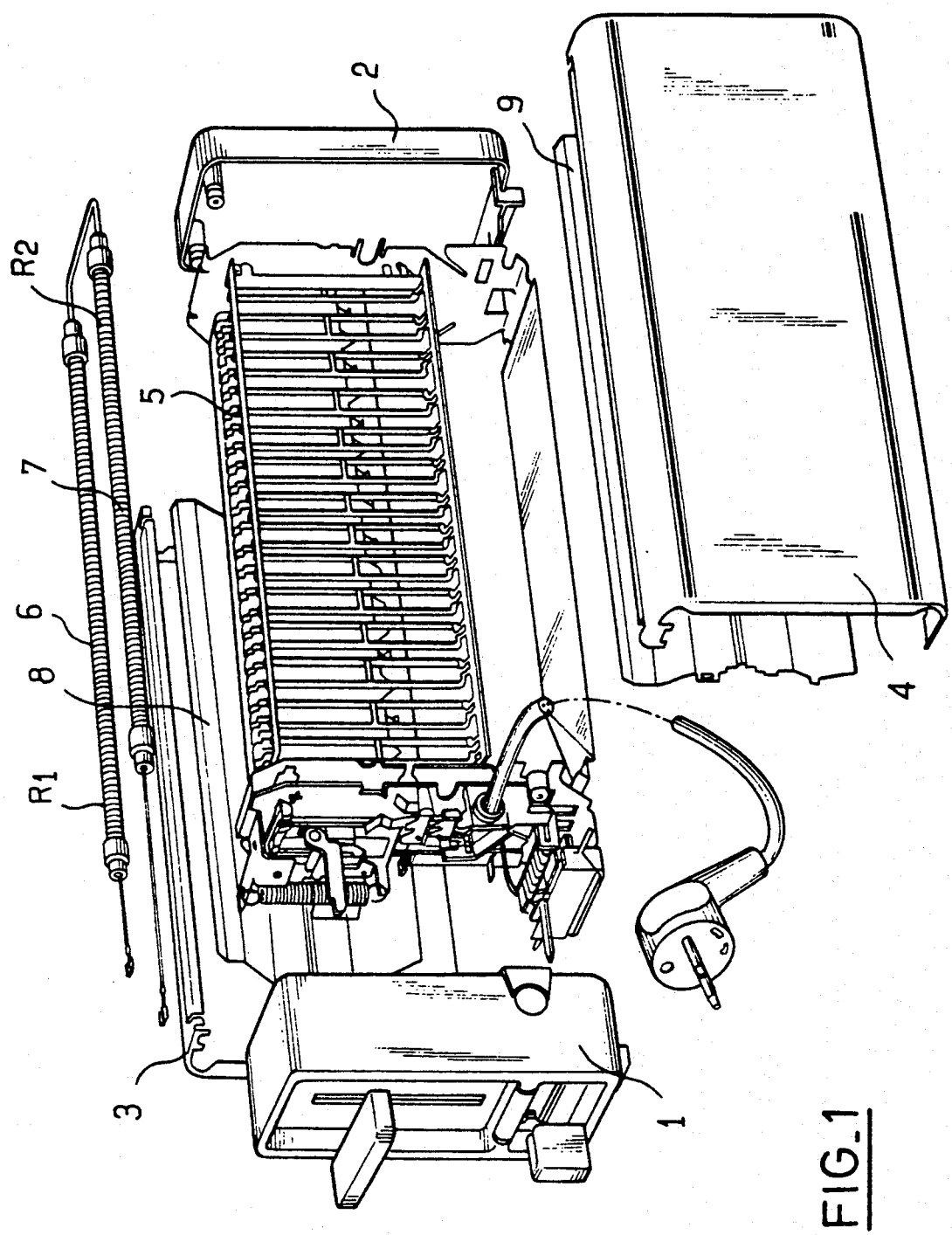
FIG. 1 is an exploded perspective view of a toaster.

FIG. 1 represents a known toaster. The latter has, inside a parallelepipedic shell with four lateral faces 1, 2, 3, 4, a cage 5 for supporting pieces of bread between two heating tubes 6, 7 arranged on both sides of the cage 5 substantially halfway up the lateral faces 3, 4.

The heating tubes 6, 7, each comprise an insulating tube, made of steatite for example, on which a resistive heating wire $R_1$, $R_2$, made of nickel-chrome for example, is helically wound. The two resistive wires $R_1$, $R_2$ are connected in series.

Arranged between the heating tubes 6, 7 and the lateral faces 3, 4 are reflectors, 8, 9 which reflect the infrared radiation emitted by the resistors $R_1$ and $R_2$ toward the pieces of bread arranged in the cage 5.

According to the invention, on both sides of the housing consisting of the cage 5 there is provided at least one second electric resistor, commutation means being provided to connect one or both of the two above-mentioned resistors to the mains, as desired.

In the preferred embodiment represented in FIGS. 2 and 3, each insulating tube 10, 11 also carries one of said second electric resistors $R_3$, $R_4$, these latter being helically wound inside each tube 10, 11.

Each end of the insulating tubes 10, 11 receives a connection piece 12a, 12b; 13a, 13b each carrying two conducting wires 14a, 14b; 15a, 15b connected to the outer resistors $R_1$, $R_2$ and inner resistors $R_3$, $R_4$ respectively.

The inner resistors $R_3$, $R_4$ may, for example, have an ohmic value substantially equal to half that of the outer resistors $R_1$, $R_2$.

FIG. 4 shows the electrical diagram of connections of the resistors $R_1$, $R_2$, $R_3$, $R_4$. In this diagram the commutator 16 is adapted to control, as desired, the two following heating modes:

normal heating provided by the first two resistors $R_1$, $R_2$ wound on the insulating tube 10, 11, the two inner resistors $R_3$, $R_4$ being disconnected;

heating provided by the first two resistors $R_1$, $R_2$ wound on the insulating tube 10, 11 and the two inner resistors $R_3$, $R_4$.

Furthermore, the commutator 16 is additionally adapted to control the following third heating mode:

heating provided by one $R_1$ of the resistors wound on the tube 10, 11 and by the two inner resistors $R_3$, $R_4$.

In the diagram of FIG. 4, it can be seen additionally that the two inner resistors $R_3$, $R_4$ are connected in series with the two resistors $R_1$, $R_2$ wound on the outside of the tube 10, 11 and are contained between these resistors. The commutator 16 has one A of its terminals connected to the electrical junction B between one $R_2$ of the outer resistors and one $R_4$ of the inner resistors. The other terminal C of this commutator 16 may be connected as the user desires:

either to the junction D between the other outer resistor $R_1$ and the other inner resistor $R_3$ (position I), or to the end E of the first outer resistor $R_2$ opposite the first terminal A of the commutator 16 (position III), or to a position II which is not connected to any of the resistors $R_1$, $R_2$, $R_3$, $R_4$.

In the diagram of FIG. 4, the reference numbers 17, 18 designate a bipolar switch which cuts the electrical supply for heating the resistors $R_1$, ... $R_4$ when the heating time is attained.

In the position I of the commutator 16, the inner resistors $R_3$ and $R_4$ are shunted; only the resistors $R_1$ and $R_2$ heat up and emit heat radiation toward the pieces of bread. This position I corresponds to the normal operation of a conventional toaster; the pieces of bread are toasted in the same way on both sides.

In the position II, the commutator 16 does not provide any electrical connection.

The current supplies the resistors $R_1$, $R_2$, $R_3$, $R_4$ in series.

Compared with the position I, the heating power of the resistors $R_1$ and $R_2$ decreases, as does the surface temperature of the pieces of bread, for an identical time base. This temperature is, for example, approximately 700° C. instead of 900° C. in position I. Thus, the pieces of bread are less toasted on the surface.

This position II is therefore suitable for defrosting or reheating pieces of bread without browning them on the surface.

In the position III, the outer resistor $R_2$ is shunted. The resistors $R_3$ and $R_4$ in series with the resistor $R_1$ have substantially the same ohmic value as the resistors $R_1$ and $R_2$ in the position I. The outer resistor $R_1$ emits infrared radiation toward the pieces of bread.

The result is that only the side of the pieces of bread facing the resistor $R_1$ is toasted and browns, whereas the other side facing the resistor $R_2$ not supplied with current is reheated without browning by virtue of the heating of the resistor $R_4$ enclosed in the tube 11.

This position III is perfectly suited to pieces of baguettes which have a crust on one side.

In the three operating modes, the working time for obtaining the desired result does not exceed the capabilities of the time-delay system of the appliance. Since the heater resistor $R_5$ providing automatic control is connected directly to the mains supply, it is not affected by the various commutations, thereby permitting absolute safety of operation.

Of course, the number of steatite tubes, of manifold ohmic values and of numerous commutations, may be combined for quite specific uses without departing from the scope of the invention.

Thus, the resistors $R_3$ and $R_4$ could be wound on tubes or insulating supports which are distinct from those on which the resistors $R_1$ and $R_2$ are wound. In this case, masks could be provided for limiting the infrared radiation emitted by the resistors $R_3$ and $R_4$.

The resistors $R_3$ and $R_4$ could also be wound on the insulating tubes already carrying the resistors $R_1$ and $R_2$.

It is obvious that the above tubes may be replaced by any known heating element, such as micanite plate or some other insulator, on which the resistors are fixed or in which they are enclosed. These resistors may consist of wires fastened between insulating supports, of screened resistors comprising a plurality of resistive conductors, or some other heating device permitting the above commutations.

Figure 5:
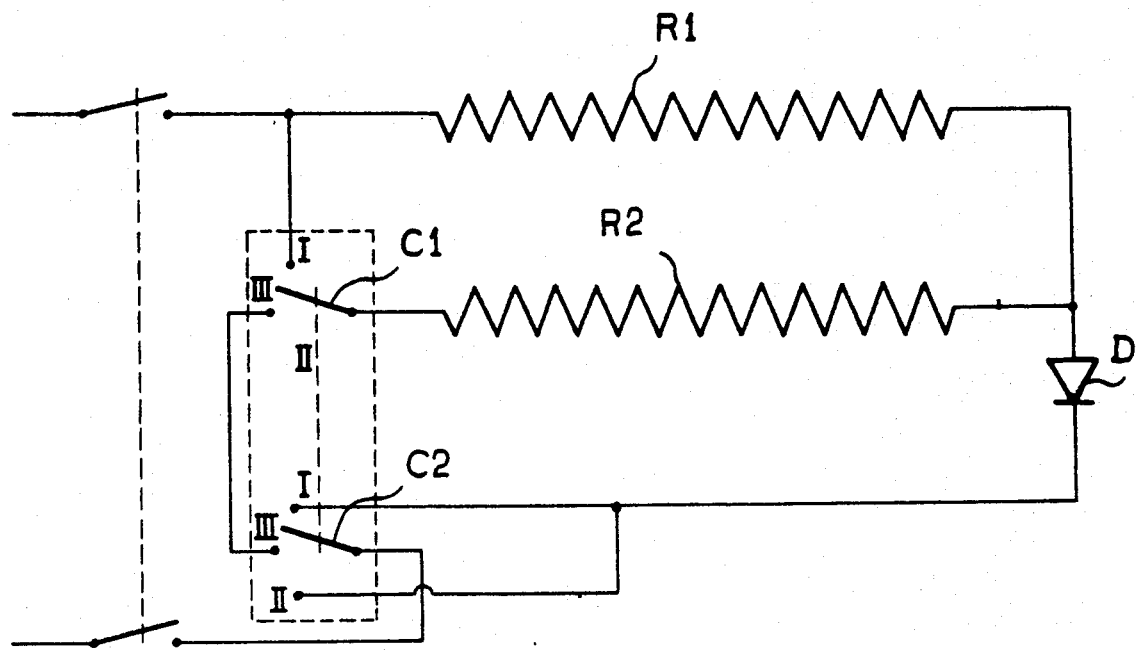
FIGS. 5 and 6 show electrical diagrams relating to alternative embodiments.
Figure 6:
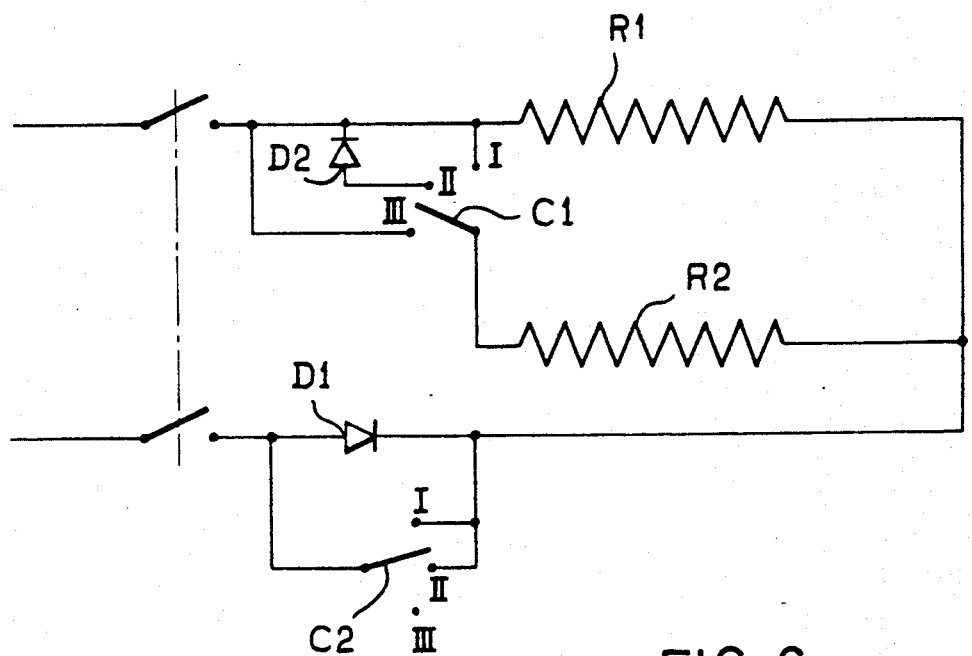

FIGS. 5 and 6 represent electrical diagrams which make it possible to obtain three heating functions I, II, III by means of only two resistors $R_1$, $R_2$, as a result of using one diode D or two diodes $D_1$, $D_2$ which limit the passage of alternating current to two half-alternations and thus reduce the heating power.

In the case of FIG. 5, the two resistors $R_1$ and $R_2$ are at a voltage of 110V. The commutators $C_1$ and $C_2$ make it possible to select the three heating functions I, II, III.

In position I, the two resistors $R_1$ and $R_2$ are in parallel, the heating power is normal and is applied to both sides of the bread to be toasted.

In position III, the two resistors $R_1$ and $R_2$ are in series, but the diode D is no longer connected, the power being reduced by half. This function is used for reheating.

In position II, one of the resistors is at half power and the other is not supplied. This function is used for toasting bread having a crust on one side.

In the case of FIG. 6, when the commutators $C_1$ and $C_2$ are in position I, the heating is normal on the two sides of a slice of bread.

When the commutators $C_1$ and $C_2$ are in position II, one of the resistors is cut off (zero heating) and the other resistor is at full power. This position permits toasting of the side of a slice of baguette opposite that having the crust.

When the commutator $C_1$ is in position II and the commutator $C_2$ in position III, one of the resistors is at full power and the other at half power, thereby permitting toasting of one of the sides of the slice of baguette and reheating of the other side.

When the commutator $C_1$ is in position III and the commutator $C_2$ in position III, the heating is reduced on both sides.

When the commutator $C_1$ is in position II and the commutator $C_2$ in position III, the heating is zero on one of the sides and reduced on the other side, thereby permitting reheating of only one of the sides of a slice of bread.

I claim:

1. A toaster comprising a housing (5) for receiving bread to be toasted or to be reheated and on both sides of this housing an electric heating element having at least one electric resistor ($R_1$, $R_2$) wound on an elongated support made of insulating material (10, 11), wherein commutation means (16) are provided to connect to a power source, sat at least one resistor, to effect the three following heating modes:
   heating at maximum power or both sides of the housing,
   high heating at maximum power on one side of the housing and moderate or no heating on the other side of the housing,
   moderate heating on each side of the housing.

2. The toaster as claimed in claim 1, wherein each insulating support (10, 11) also carries a second electric resistor ($R_3$, $R_4$).

3. The toaster as claimed in claim 2, the electrically insulating supports (10, 11) each consisting of a tube made of insulating material and the first resistor ($R_1$, $R_2$) being helically wound around this tube, wherein the second resistor ($R_3$, $R_4$) is situated inside the tube.

4. The toaster as claimed in claim 3, wherein the second resistor ($R_3$, $R_4$) extends helically inside the tube.

5. The toaster as claimed in claim 3, wherein commutation means (16) is adapted to control the three following heating modes:
   normal heating provided by the first two resistors ($R_1$, $R_2$) wound on the insulating tube, the two inner resistors ($R_3$, $R_4$) being disconnected;
   heating provided by the first two resistors ($R_1$, $R_2$) wound on the insulating tube and the two inner resistors ($R_3$, $R_4$),
   heating provided by one ($R_1$) of the resistors wound on the tube (10, 11) and by the two inner resistors ($R_3$, $R_4$).

6. The toaster as claimed in claim 5, wherein the two inner resistors ($R_3$, $R_4$) are connected in series with the two resistors ($R_1$, $R_2$) wound on the outside of the tube and are contained between these resistors, the commutation means (16) having one of its terminals connected to the electrical junction between one ($R_2$) of the outer resistors and one ($R_4$) of the inner resistors, it being possible for the other terminal of this commutation means (16) to be connected as the user desires:
   either to the junction between the other outer resistor ($R_1$) and the other inner resistor ($R_3$),
   or to the end of the first outer resistor ($R_2$) opposite the first terminal of the commutation means (16),
   or to a position which is not connected to any of the resistors ($R_1$, $R_2$, $R_3$, $R_4$).

7. The toaster as claimed in claim 2, wherein the second resistor ($R_3$, $R_4$) has an ohmic value substantially equal to half that of the first resistor ($R_1$, $R_2$).

8. The toaster as claimed in claim 1, wherein the three heating functions are provided by means of only two resistors ($R_1$) and ($R_2$), and diode means (D, $D_1$, $D_2$) in circuit with said resistors ($R_1$, $R_2$) to permit a reduction in the heating power of one or both resistors.

* * * * *